Nov. 28, 1967  F. SAGE  3,355,357
PRESTRESSED CONCRETE PRESSURE VESSELS FOR USE
IN NUCLEAR INSTALLATIONS
Filed June 3, 1965  3 Sheets-Sheet 1
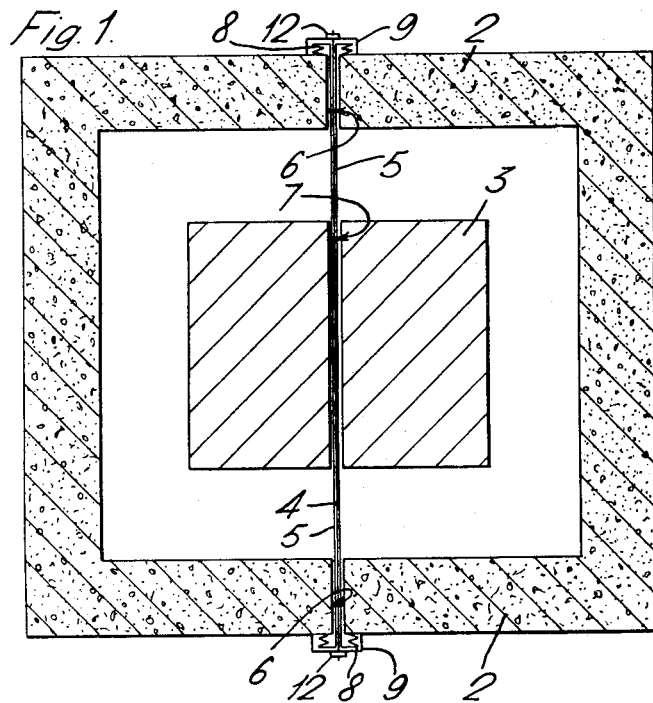
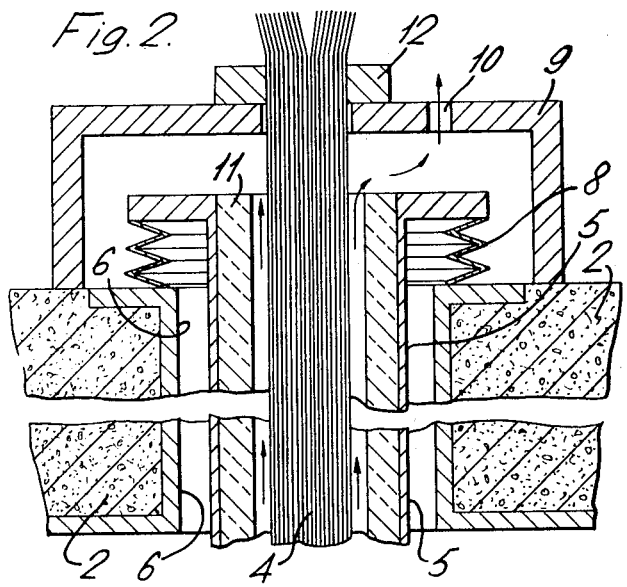

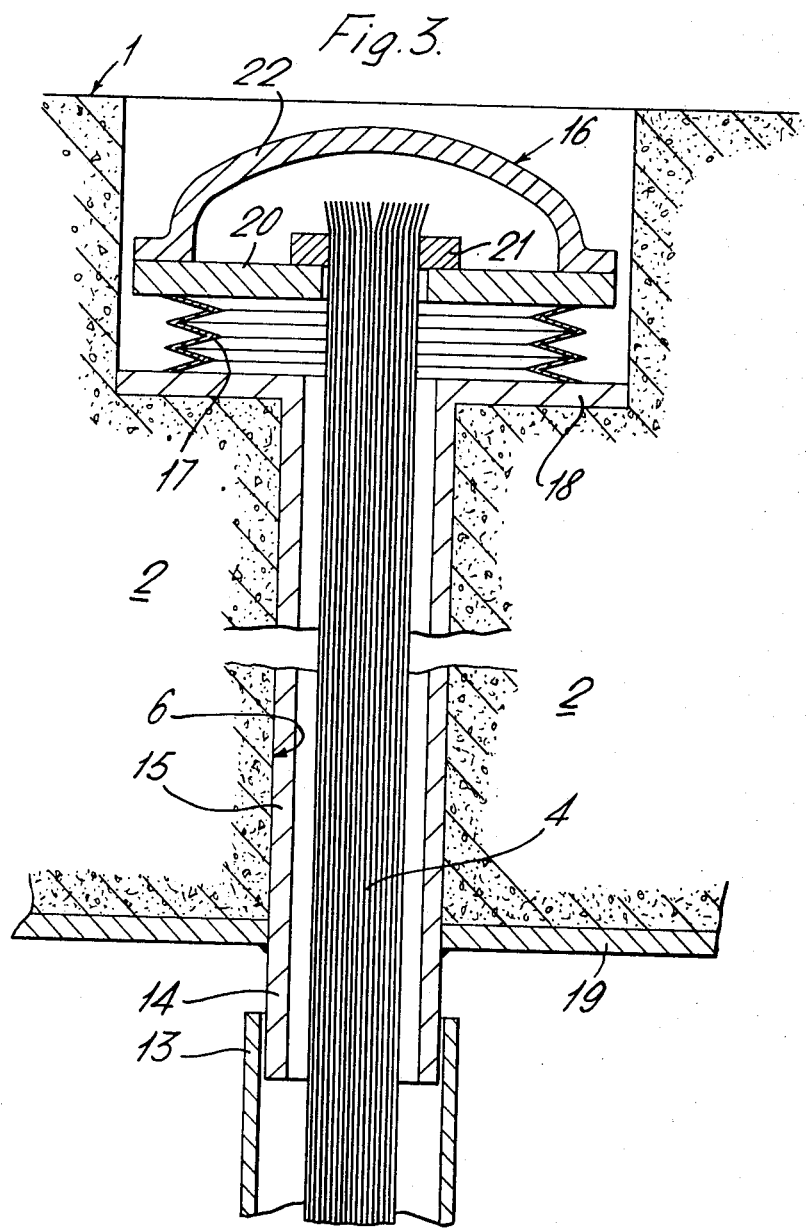

though the effects of neutron irradiation are unlikely to be serious, but the effect of elevated temperature would cause the cable means to extend, and would also enhance the creep rate, leading to a reduction in the prestressing force in the cable means. This difficulty may be overcome in either or both of two ways: firstly by cooling the cable means, and secondly by providing means to compensate continuously and automatically for extension in the cable means.

United States Patent Office 3,355,357
Patented Nov. 28, 1967

3,355,357
PRESTRESSED CONCRETE PRESSURE VESSELS FOR USE IN NUCLEAR INSTALLATIONS
Frederick Sage, Risley, England, assignor to United Kingdom Atomic Energy Authority, London, England
Filed June 3, 1965, Ser. No. 460,947
Claims priority, application Great Britain, June 17, 1964, 25,003/64
7 Claims. (Cl. 176—40)

This invention relates to prestressed concrete pressure vessels and is primarily concerned with vessels for use in nuclear installations. By the term "prestressed concrete pressure vessel" is meant a concrete vessel embraced or partly embraced by wires or cables which are tensioned to induce compressive stresses within the structure and thereby nullify or partially nullify tensile stresses induced by gas or liquid pressure within the vessel. The wires or cables can be tensioned prior to subjecting the vessel to internal pressure and may be further tensioned after pressurisation.

A convenient shape for a concrete pressure vessel containing the core and, in some cases additionally in so-called integral designs, boilers of a nuclear reactor is cylindrical, and it is economical to form the ends of such a vessel as slabs which span across the diameter of the cylinder. Such slabs must carry the transverse load of the internal pressure by their strength to resist bending and/or their strength has domes in compression. Such slabs therefore must be sufficiently prestressed to neutralise the tensile stresses produced by bending or by dome action, due to internal pressure.

The prestressing of vessel ends is commonly performed by suitable wires or strands passing through each vessel end and/or embracing the outer perimeter of the respective end and exerting an inward force. There is a conflict between the requirement to nullify the effects of internal pressure and the necessity of avoiding excessive stresses when the internal pressure is not present, i.e. when the reactor is depressurised.

It is an object of the present invention to provide an improved structure incorporating the ends of a cylindrical or other elongate concrete pressure vessel being braced against forces induced by internal pressure, and furthermore to provide an improved method of accomplishing such bracing.

According to the invention, a structure embodying a cylindrical or other elongate concrete pressure vessel and having its ends braced against forces produced by internal pressure has the bracing accomplished by elongate means capable of withstanding tensile load and disposed within the pressure vessel so as to extend between the ends thereof, and means for anchoring the ends of said elongate means to the respective ends of the pressure vessel so as to connect the vessel ends together for providing prestressing forces opposing internal pressure in the vessel.

Where the vessel is cylindrical, the said elongate means may comprise cable means of tensile-load-bearing capability and disposed coaxially with the longitudinal axis of the vessel; alternatively, a number of cables of tensile-load-bearing capability may be symmetrically disposed longitudinally in the vessel. Where the structure forms part of a nuclear reactor installation and the vessel is cylindrical, and an annular shield wall is provided to divide the core from boilers disposed annularly around the core, both core and heat exchangers being within the vessel, the cables are conveniently disposed so as to extend through longitudinal apertures in the shield wall and equally spaced therearound, with or without axially disposed cable means as aforesaid.

The prestressing cable means would be subjected in operation to neutron irradiation and would pass through spaces at elevated temperatures; experience shows, that the effects of neutron irradiation are unlikely to be serious, but the effect of elevated temperature would cause the cable means to extend, and would also enhance the creep rate, leading to a reduction in the prestressing force in the cable means. This difficulty may be overcome in either or both of two ways: firstly by cooling the cable means, and secondly by providing means to compensate continuously and automatically for extension in the cable means.

Constructional embodiments of the invention will now be described by way of example with reference to the accompanying drawings, in which like reference numerals indicate like parts, and wherein:

FIGURE 1 is a vertical medial section and illustrates one construction,

FIGURE 2 is an enlarged fragmentary section of a detail of FIGURE 1,

FIGURE 3 is an enlarged fragmentary section illustrating another construction.

Figure 4:
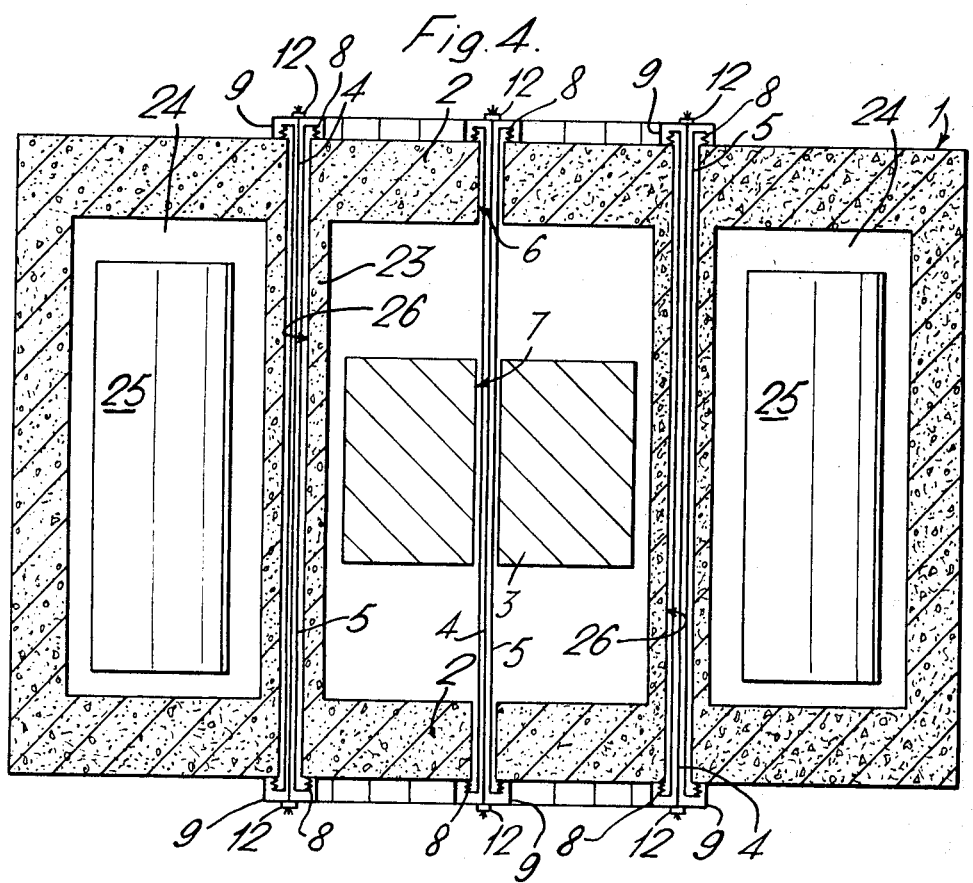
FIGURE 4 is a vertical medial section and illustrates a further construction.

Referring to FIGURES 1 and 2 of the drawings, a nuclear reactor concrete pressure vessel 1 is cylindrical, has ends 2 of flat slab form, and contains a reactor core 3. The ends 2 are connected by a cable 4 constituted by a single thick wire or rod (for example 1¼" diameter) or, as shown, a stranded wire rope of equivalent or greater diameter which extends longitudinally and axially through the vessel 1 and is disposed in a pressure tight tube 5. The tube 5 passes freely through apertures 6 in the ends 2 of the vessel and is continuous from outer face to outer face of the ends 2. The tube 5 also extends through an axial channel 7 in the core 3. In order to retain the internal pressure in the vessel 1 whilst permitting axial movements of the tube 5, means comprising flexible bellows 8 and illustrated in FIGURE 2 are applied at the outer face of each end 2, the bellows 8 and the ends of the tube 5 being accommodated in a chamber 9 mounted on the respective vessel end 2, the top end chamber 9 having an outlet 10 and the bottom end chamber having an inlet (neither of which is shown in FIGURE 2). The interior surface of tube 5 is lined with heat insulating material 11 so that the cable 4 can be kept cool by a current of air which is caused to enter at the inlet of the bottom end chamber and leaves at the outlet 10 of the top end chamber 9. Prestressing forces are produced in the cable 4 in the normal way by jacking and anchoring (for example as shown at 12 in FIGURE 2) against the outer surface of the end chambers at the respective vessel ends.

Referring now to FIGURE 3, the construction is as generally shown in FIGURE 1 except that the means for dealing with the difficulty of extension of the cable is different from that described with reference to FIGURE 2. The attachment of the cable 4 to the ends 2 of the vessel 1 is made by means of an anchor device 16 situated at each end of the vessel 1 and which maintains an appropriate force in the cable 4 regardless of its extension. The cable 4 passes through a sheath 13 which has provision for relative expansion or contraction and fits loosely over a tubular spigot 14 formed on a lining 15 for each aperture 6 in each vessel end 2; the sheath 13 is therefore not gas tight so that the internal pressure in the vessel 1 is transmitted to the interior of the sheath 13 and, via the tubular spigots 14, to each anchor device 16. Each device 16 comprises a flexible bellows 17 the lower end of which is sealed via a flange 18 of the lining 15, the latter being sealed with a liner 19 for the vessel 1. At the top of bellows 17 a strong diaphragm 20 is attached to which the cable 4 is anchored as at 21. A detachable pressure tight cover 22 is bolted to the diaphragm 20.

It will be seen that the anchor device 16 at each end of the vessel ensures that a force, derived from internal pressure and acting on each diaphragm 20, is produced in the cable 4 equal to the internal pressure in the vessel acting on an area bounded by the circumference of the bellows 17 minus the net area of the cable 4, whilst an opposite reaction is produced on each vessel end 2 which is equal to the internal pressure in the vessel acting on an area bounded by the circumference of the bellows 17 minus the area bounded by the inner circumference of the liner 15. The said force and opposite reaction are nearly equal, and their magnitude can be controlled by correct choice of dimensions, of which the diameter of the bellows 17 is the most important. Thus the magnitude of the resultant force on the cable 4 can be controlled in a manner such that the prestressing forces applied laterally by the cable 4 to the ends 2 of the concrete vessel 1 are always precisely suited to the internal pressure in the vessel, so that a largely self balancing effect can be obtained. Moreover, the extension of the cable 4 is automatically taken up, so long as it does not exceed the safe extension of the bellows 17. When and if this should occur the vessel 1 is depressured, the cover 22 removed from the upper device 16, which is normally more accessible than the lower device, and shims are placed between the diaphragm 20 and the anchorage 21 of the cable 4 to take up the excess extension. The cable 4 can also be replaced, if it should prove necessary, by the access obtained by removing the cover 22 from each device 16.

Referring now to FIGURE 4, in the construction shown therein, the concrete pressure vessel 1 has in addition to its ends 2 an annular wall 23 dividing the reactor core 3 from an annular chamber 24 (or a number of part-annular chambers) in which are disposed boilers 25 and coolant gas circulators (not shown). The wall 23 may be employed for housing a plurality of tubes 5 disposed in longitudinal penetrations 26 which are arranged symmetrically around the wall 23. Bracing for the vessel ends 2 as described with reference to FIGURES 1 and 2 is effected with the aid of the tubes 5 and the cables 4 therein are air-cooled as described. This has the added advantage of assisting in cooling the concrete of the wall 23. There is preferably in addition an axial bracing connection which may be either as described with reference to FIGURES 1 and 2 (as shown in FIGURE 4) or as described with reference to FIGURES 1 and 3.

In all the described embodiments, leakage of neutrons or radiation from the vessel 1, through the penetrations 6 required for the prestressing cables 4, will be much reduced by the presence of the cables 4, which largely fill the penetrations. Further shielding can be applied externally if required (not shown).

The method and structure of the invention provide a simple and economic expedient for prestressing the ends of a concrete pressure vessel and furthermore can lead to further economy of material and labour, since flat ends rather than domed ones can readily be employed. The invention is equally applicable to domed-ended structures, however.

I claim:
1. A nuclear reactor installation comprising a cylindrical concrete pressure vessel having cylindrical side walls adapted to withstand forces produced by internal pressure of the fluid within the chamber and having opposing ends, a nuclear reactor core and heat exchangers contained in said pressure vessel, an annular shield wall within said vessel for separating said core from said heat exchangers, the said heat exchangers being disposed annularly around said core, elongate means capable of withstanding tensile load extending between the opposing ends and disposed inwardly of said pressure vessel side walls, means for anchoring said elongate means to each of the opposing ends of said pressure vessel thereby connecting the said ends together for bracing said ends for opposing the outwardly directed forces produced by internal pressure of fluid within the vessel, means for cooling said elongate means in regions within the pressure vessel where said elongate means becomes subjected to elevated temperatures, said elongate means being constituted by cable means, and said means for cooling said elongate means comprising a pressure tight tube containing the cable means and extending outside the concrete pressure vessel pressure boundary at both ends, and including means for directing a flow of cooling fluid over the cable means within the pressure tube.

2. A nuclear reactor installation according to claim 1, wherein said pressure tube is sealed in its passage through the ends of the concrete pressure vessel by bellows thereby maintaining the pressure-tight integrity of the concrete pressure vessel.

3. A nuclear reactor installation comprising a cylindrical concrete pressure vessel having cylindrical side walls adapted to withstand forces produced by internal pressure of the fluid within the chamber and having opposing ends, a nuclear reactor core and heat exchangers contained in said pressure vessel, an annular shield wall within said vessel for separating said core from said heat exchangers, the said heat exchangers being disposed annularly around said core, elongate means capable of withstanding tensile load extending between the opposing ends and disposed inwardly of said pressure vessel side walls, means for anchoring said elongate means to each of the opposing ends of said pressure vessel thereby connecting the said ends together for bracing said ends for opposing the outwardly directed forces produced by internal pressure of fluid within the vessel, and including means for automatically and continuously compensating for extension in said elongate means due to elevated temperatures.

4. A nuclear reactor installation according to claim 3 wherein the said compensating means comprises a bellows means, said elongate means being connected to said bellows means at at least one end of said pressure vessel.

5. An elongated concrete pressure vessel having two opposed ends and elongated side walls, and bracing means for bracing the ends against outwardly directed forces produced by internal pressure of heated fluid within the vessel, said bracing means including elongate means for opposing said internal pressure on said ends of the vessel, said elongate means being disposed inwardly of said pressure vessel side walls and extending between the vessel ends, means for anchoring the ends of said elongate means to the opposed ends of the pressure vessel for connecting said ends together to provide prestressing forces opposing the forces due to internal pressure on said ends, and means for avoiding reduction in the prestressing function of said elongate means due to thermal expansion thereof when subjected to the heated fluid within said vessel, wherein said means for avoiding reduction in the prestressing function of said elongate means comprises a pressure-tight tube containing said elongate means and extending outside said pressure vessel boundary at both ends, and means for directing a flow of cooling fluid over said elongate means within said tube.

6. A pressure vessel according to claim 5, wherein said pressure-tight tube is sealed in its passage through the ends of said vessel by bellows for preserving the pressure-tight integrity of the vessel.

7. An elongated concrete pressure vessel having two opposed ends and elongated side walls, and bracing means for bracing the ends against outwardly directed forces produced by internal pressure of heated fluid within the vessel, said bracing means including elongate means for opposing said internal pressure on said ends of the vessel, said elongate means being disposed inwardly of said pressure vessel side walls and extending between the vessel ends, means for anchoring the ends of said elongate means to the opposed ends of the pressure vessel for connecting said ends together to provide prestressing forces opposing the forces due to internal pressure on said ends, and means for avoiding reduction in the prestressing function of said elongate means due to thermal expansion thereof when subjected to the heated fluid within said vessel, wherein said means for avoiding reduction in the prestressing function of said elongate means comprises a bellows means connecting said elongate means to at least one end of said vessel for automatically and continuously compensating for thermal expansion of said elongate means when subjected to the heated fluid within said vessel.

References Cited

UNITED STATES PATENTS

| | | | |
|---|---|---|---|
| 2,590,685 | 3/1952 | Coff | 52—230 X |
| 2,786,349 | 3/1957 | Coff | 52—223 |
| 3,115,450 | 12/1963 | Schanz | 176—87 |
| 3,145,502 | 8/1964 | Rubenstein | 52—223 |
| 3,192,121 | 6/1965 | Callender et al. | 176—87 X |
| 3,226,894 | 1/1966 | Burchardt et al. | 52—223 |
| 1,895,747 | 1/1933 | Beldimano | 52—169 |
| 3,237,358 | 3/1966 | Harris | 52—224 |

FOREIGN PATENTS

| | | |
|---|---|---|
| 861,513 | 2/1961 | Great Britain. |
| 893,668 | 4/1962 | Great Britain. |
| 898,052 | 6/1962 | Great Britain. |
| 1,288,878 | 2/1962 | France. |
| 639,089 | 5/1950 | Great Britain. |

REUBEN EPSTEIN, *Primary Examiner.*